United States Patent [19]

Stoffels

[11] Patent Number: 4,571,095
[45] Date of Patent: Feb. 18, 1986

[54] APPARATUS FOR MEASURING A TEMPERATURE

[75] Inventor: Johannes Stoffels, Delft, Netherlands

[73] Assignee: B.V. Enraf-Nonius Delft, Netherlands

[21] Appl. No.: 632,129

[22] Filed: Jul. 18, 1984

[30] Foreign Application Priority Data

Jul. 20, 1983 [NL] Netherlands .......................... 8302593

[51] Int. Cl.⁴ .............................................. G01K 7/16
[52] U.S. Cl. ..................................... 374/167; 374/183; 374/65 R
[58] Field of Search ................ 374/163, 167, 183–185; 338/25, 28, 29, 31; 324/65 R

[56] References Cited

U.S. PATENT DOCUMENTS

| 2,508,478 | 5/1950 | Vehling | 374/183 |
| 2,884,786 | 5/1959 | Burk et al. | 324/65 R |
| 2,995,703 | 8/1961 | Rogers | 324/65 R |

FOREIGN PATENT DOCUMENTS 0137120 10/1981 Japan ................................. 374/185
0210530 12/1983 Japan ................................. 374/183

Primary Examiner—Charles Frankfort
Assistant Examiner—Patrick R. Scanlon
Attorney, Agent, or Firm—Kane, Dalsimer, Kane, Sullivan and Kurucz

[57] ABSTRACT

An apparatus for measuring a temperature comprises a first resistance, the resistance value of which depends on the temperature to be measured, a second resistance, a multiple switch with a plurality of inputs and an output, wherein the resistances each are connected to a corresponding input, a supply source which can be coupled with both resistances through a switch and a processing unit for controlling the switch and the multiple switch and for determining the temperature in dependence on the voltages measured at the supply source being switched on and off respectively, in the subsequent positions of the multiple switch. The output of the multiple switch is connected to an input of a voltage/frequency converter through a voltage source, an output of the voltage/frequency converter being connected to the processing unit.

3 Claims, 1 Drawing Figure

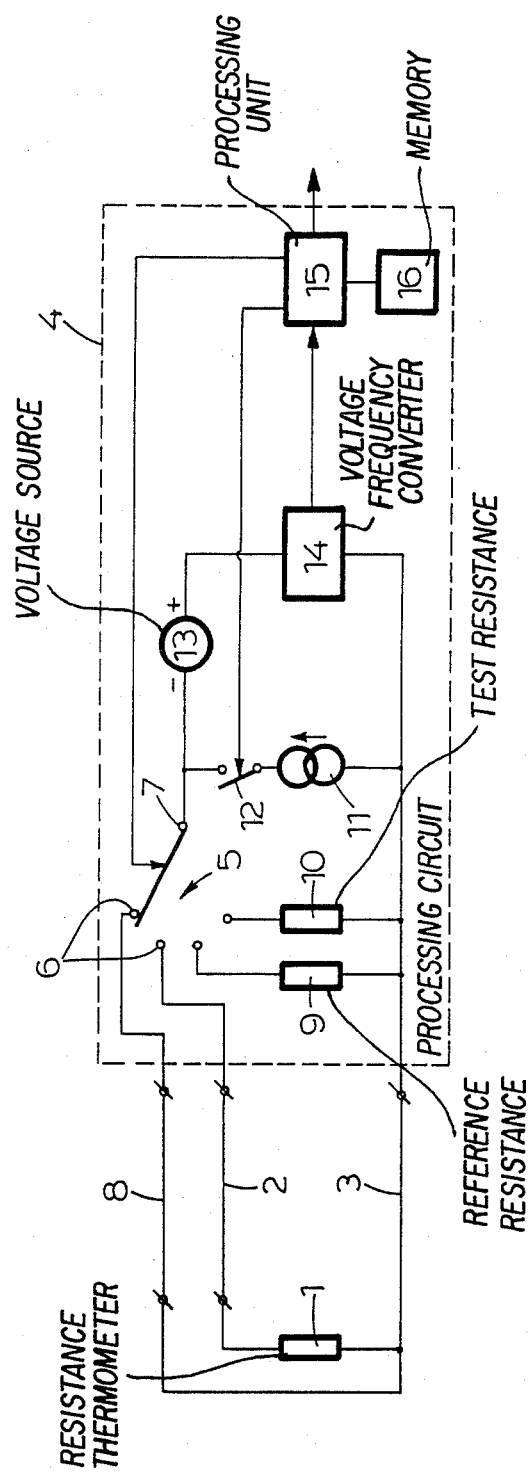

APPARATUS FOR MEASURING A TEMPERATURE

The invention relates to an apparatus for measuring a temperature, comprising a first resistance, the resistance value of which depends on the temperature to be measured, a second resistance, a multiple switch means with a plurality of inputs and an output, wherein said resistances each are connected to a corresponding input, a supply source which can be coupled with both resistances through a switch, and a processing unit for controlling said switch and said multiple switch means and for determining the temperature in dependence on the voltages measured at the supply source being switched on and off, respectively, in the subsequent positions of the multiple switch means.

At a known apparatus of this type both resistances are series connected with two further resistances, the switch and the supply source. The first and second resistances are each connected to the multiple switch means by means of two connections so that the voltage drop of each resistance is supplied to the multiple switch means with the supply source switched on and off respectively. In order to obtain the voltage drop of each resistance without any direct current level the output of the multiple switch means is connected to a differential amplifier which has to have a very high common mode rejection. Still the output signal of this differential amplifier will contain an error caused by the fact that the common mode rejection is not infinite. The output of the differential amplifier is coupled to the processing unit through a comparator which compares the output signal of the differential amplifier with a saw-tooth voltage in order to convert this output signal into a digital number. Thereby, any noise signal will directly affect the accuracy of this conversion. As appears from the foregoing, the known apparatus shows several disadvantages.

The invention aims to provide an apparatus of the above-mentioned kind, wherein these disadvantages are obviated in a simple but nevertheless effective manner.

To this end, the output of said multiple switch means is connected to an input of a voltage/frequency converter through a voltage source, an output of said voltage/frequency converter being connected to the processing unit.

By using a voltage/frequency converter the influence of any noise signal can be decreased by extending the counting period of the impulses obtained, i.e. an integration in time. Moreover, the accuracy of the frequency determination can be increased by a longer measuring period. By shifting the voltage range to be measured by means of the voltage source a voltage range is used in which the accuracy of the voltage/frequency conversion is very accurate. Within the corresponding frequency range the resolution is however still very great so that an accurate temperature measurement remains possible.

The processing unit determines the resistance value of the first resistance with respect to the measured resistance value of the second resistance, so that except for the accuracy of said second resistance the accuracy of the remaining components needs not to be very high. By using the multiple switch means the absolute voltage value of the voltage source and the long term stability are of no importance.

Finally the voltage/frequency conversion provides for a simple and good separation between the processing unit and the first resistance.

According to a favourable embodiment, wherein said first resistance is connected to the corresponding input of said multiple switch means through a first connecting line and to ground of the apparatus through a ground line, a second connecting line the resistance of which is substantially equal to that of the first connecting line, is connected to the ground line at said first resistance and to a corresponding input of the multiple switch means, the second resistance being directly connected to the corresponding input of the multiple switch means and ground, wherein the supply source is made as a current source which is connected to the output of the multiple switch means through the switch. In this manner the resistances are measured separately so that a differential amplifier can be omitted and thus the errors caused by the common mode rejection.

The invention will hereinafter be further explained by reference to the drawing in which an embodiment of the apparatus according to the invention is shown.

The apparatus comprises a first resistance or resistance thermometer 1 which can be made for example as a Cu90, Pt100 or a Ni191 element. The resistance thermometer 1 is connected through a first connecting line 2 and a ground line 3 to a processing circuit 4. The processing circuit 4 includes at its input side a multiple switch means 5 with four input terminals 6 and a common output terminal 7. The input terminals 6 are connected to said first connecting line 2, a second connecting line 8, the resistance of which is substantially equal to that of the first connecting line 2, a second or reference resistance 9 and a test resistance 10, respectively. The connecting line 8 is connected to the ground line 3 at the resistance thermometer 1, whereas the reference resistance 9 and the test resistance 10 are connected to ground.

A current source 11 series connected with a switch 12 are provided between the output terminal 7 of the multiple switch means 5 and ground. Further, the output terminal 7 is connected to the input of a voltage/frequency converter 14 through a voltage source 13 the output of said voltage/frequency converter being connected to a processing unit 15. This processing unit 15 also controls the switch 12 and the multiple switch means 5.

The operation of the described apparatus is as follows:

With current source 11 switched on the processing unit 15 determines subsequently the resistance of the connecting line 8, of the resistance thermometer 1, of the reference resistance 9 and of the test resistance 10. Subsequently, the same series of measurements is repeated with the current source 11 switched off. At this last-mentioned measurements the thermovoltages of the different contact junctions in the circuit are determined so that these thermovoltages can be arithmetically eliminated from the resistance measurements with the current source 11 switched on by the processing unit 15. By measuring the resistance of the connecting line 8, the resistance of the connecting line 2 and the ground line 3 can be eliminated from the measurement of the resistance of the resistance thermometer 1.

All voltages measured are converted into frequency values by the voltage/frequency converter 14, wherein by the insertion of the voltage source 13 the voltage range to be measured is shifted to a frequency range, in which the linearity of the conversion of the voltage/frequency converter 14 is very accurate. In this manner the range of low frequencies where the linearity of the conversion is not very accurate, is avoided. The resolution is nevertheless very high by using the digital frequency measurement by the processing unit 15, for example by using a counter with a capacity of $2^{20}$. Further, the voltage/frequency converter 14 provides for a relatively low cost separation between the resistance thermometer 1 and the processing unit 15, whereby the savity is increased.

The processing unit 15 determines the temperature to be measured by dividing the measured resistance value of the resistance thermometer 1 by the measured value of the reference resistance 9, wherein the result is converted into a temperature value by means of a memory 16. To this end a table of measuring values/temperature values is stored in the memory 16, whereby a possible non-linearity of the resistance variation of the resistance thermometer can be corrected.

Due to the relative measurement with respect to the reference resistance 9 it is not necessary to make rather high requirements for the accuracy of the current source 11 and the voltage source 13. For example, the absolute voltage value of the voltage source 13 and the long term stability thereof are not of importance for the accuracy. Of course, the reference resistance 9 should be very accurate and should have a very good long term stability.

The test resistance 10 is provided for controlling the operation of the apparatus. The processing unit 15 also determines at each temperature measurement whether the resistance ratio of the test resistance 10 and the reference resistance 9 lies within a predetermined allowable range, wherein an alarm signal can be generated if this ratio lies outside of the allowable range.

It is noted that although according to the embodiment shown the current source 11 and the voltage source 13 use a common multiple switch means 5, it is also possible to provide a separate multiple switch means for the current source and the voltage source.

The invention is not restricted to the above-described embodiment which can be varied in a number of ways within the scope of the invention.

I claim:

1. Apparatus for measuring a temperature, comprising a first resistance, the resistance value of which depends on the temperature to be measured, a second resistance, a multiple switch means with a plurality of inputs and an output, wherein each said resistance is connected to a corresponding input, a supply source which can be selectively coupled with both resistances through a switch, and a processing unit for controlling said switch and said multiple switch means and for determining the temperature in dependence on voltages measured at said multiple switch means as the supply source is being switched on and off, respectively, by said switch in the subsequent positions of the multiple switch means, characterized in that the output of said multiple switch means is connected to an input of a voltage/frequency converter through a voltage source, an output of said voltage/frequency converter being connected to the processing unit to determine the temperature.

2. Apparatus according to claim 1, wherein said first resistance is connected to its corresponding input of said multiple switch means through a first connecting line and to ground of the apparatus through a ground line, characterized in that, a second connecting line, the resistance of which is substantially equal to that of the first connecting line, is connected to the ground line at said first resistance and to a corresponding input of the multiple switch means, the second resistance being directly connected to its corresponding input of the multiple switch means and ground, wherein the supply source is made as a current source which is connected to the output of the multiple switch means through the switch.

3. Apparatus according to claim 2, characterized in that said multiple switch means comprises an input to which one end of a test resistance is connected, the other end of which is connected to ground.

* * * * *